A. JOHNSON.
WHEEL MOUNT.
APPLICATION FILED JULY 25, 1913.
1,114,481.
Patented Oct. 20, 1914.
4 SHEETS—SHEET 1.
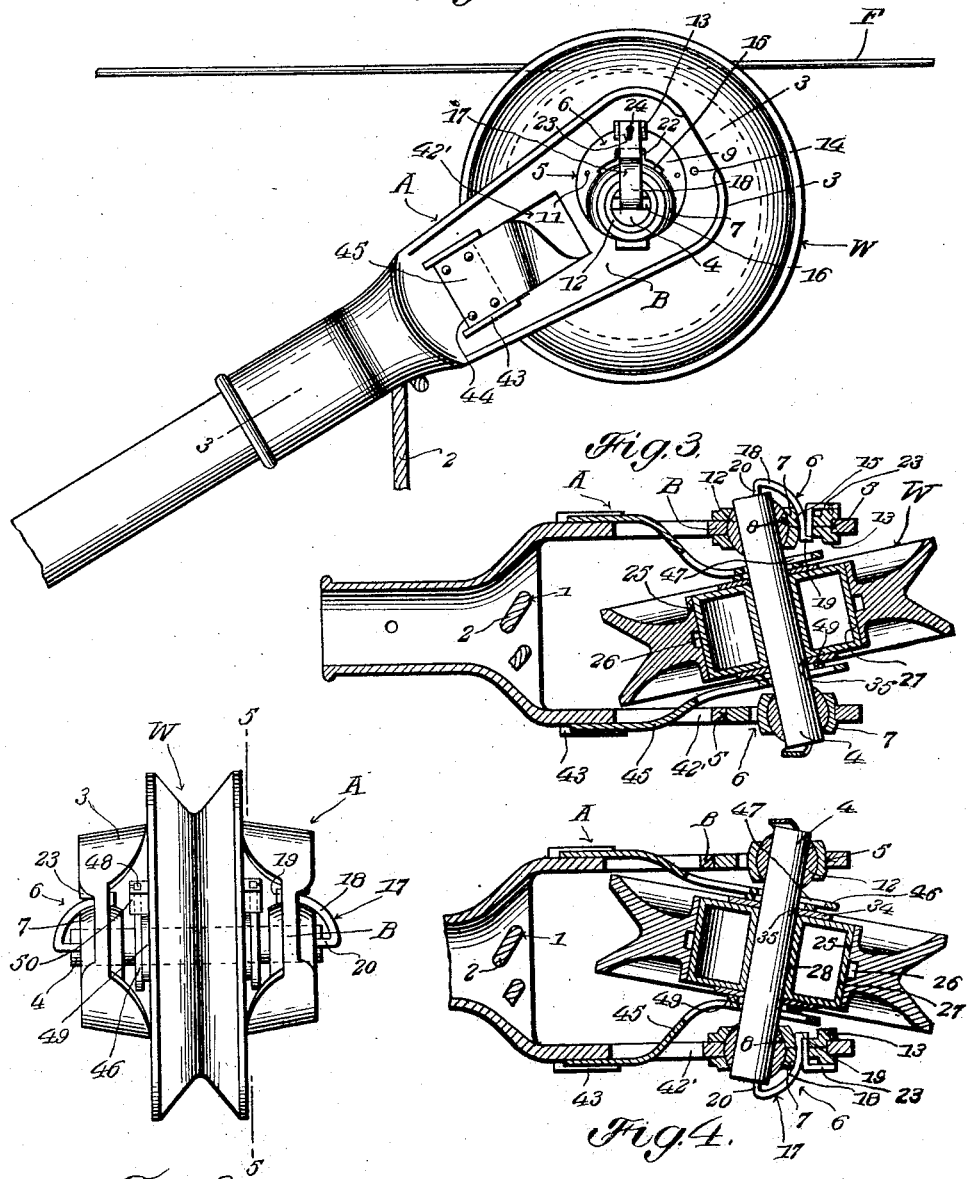
Inventor
Alfred Johnson,
Witnesses
J. H. Crawford
By Victor J. Evans
Attorney A. JOHNSON.
WHEEL MOUNT.
APPLICATION FILED JULY 25, 1913.
1,114,481.
Patented Oct. 20, 1914.
4 SHEETS—SHEET 2.
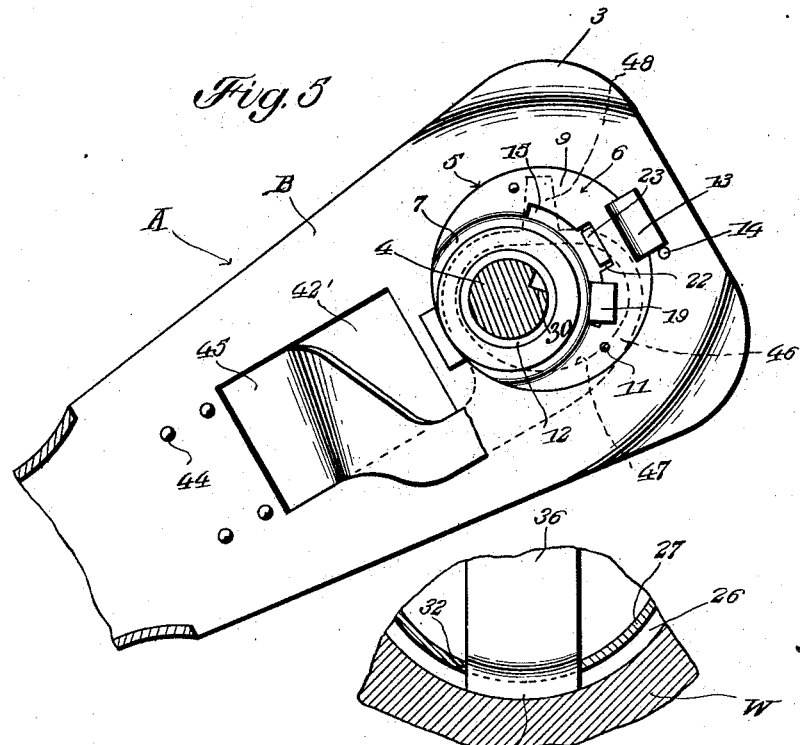
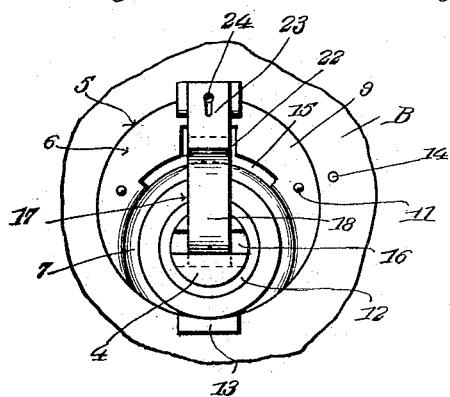
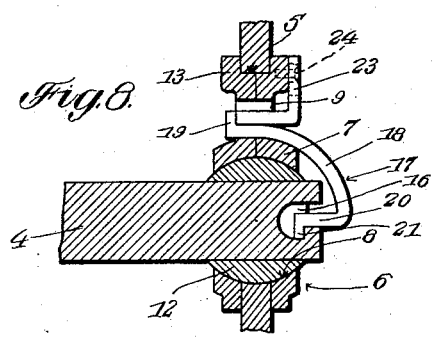
Inventor
Alfred Johnson,
Witnesses
J. H. Crawford,
By Victor J. Evans
Attorney

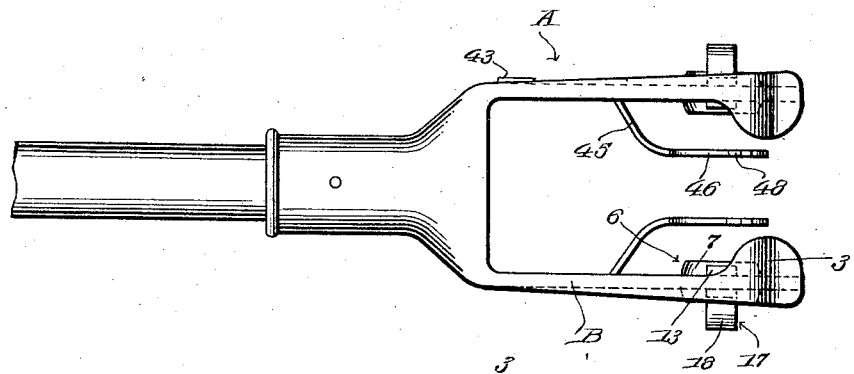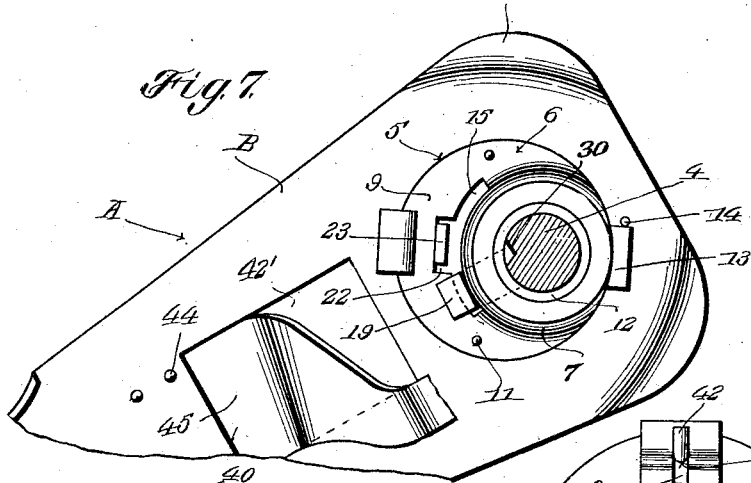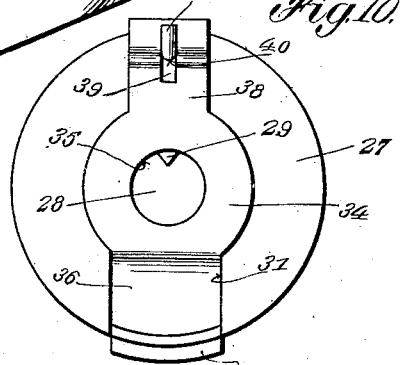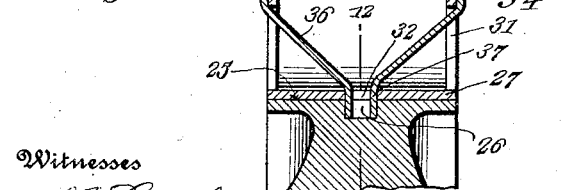

A. JOHNSON.
WHEEL MOUNT.
APPLICATION FILED JULY 25, 1913.
1,114,481.
Patented Oct. 20, 1914.
4 SHEETS—SHEET 4.
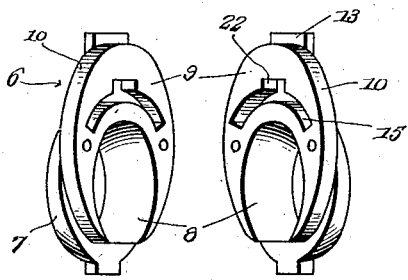
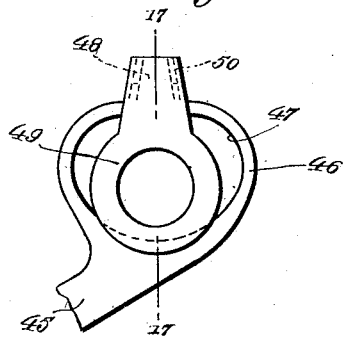
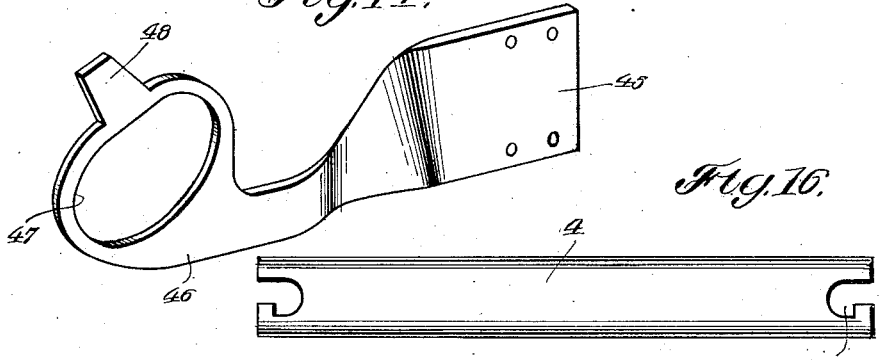
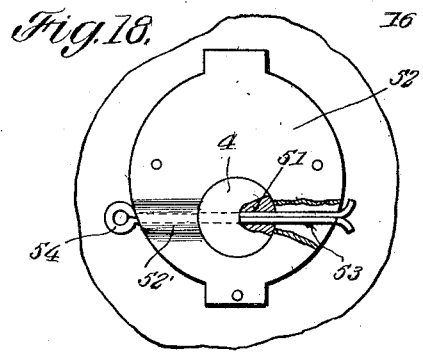
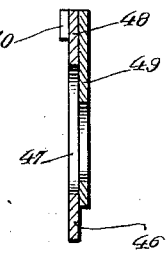
Witnesses
J. H. Crawford
Inventor
Alfred Johnson
By Victor J. Evans
Attorney

UNITED STATES PATENT OFFICE.

ALFRED JOHNSON, OF QUINCY, ILLINOIS.

WHEEL-MOUNT.

1,114,481. Specification of Letters Patent. Patented Oct. 20, 1914.

Application filed July 25, 1913. Serial No. 781,259.

*To all whom it may concern:*

Be it known that I, ALFRED JOHNSON, a citizen of the United States, residing at Quincy, in the county of Adams and State of Illinois, have invented new and useful Improvements in Wheel-Mounts, of which the following is a specification.

The present invention relates to certain novel improvements in trolley harps and trolley wheels therefor.

In carrying out my invention, I propose to provide a trolley harp with a novel construction of bearing for the trolley axle, whereby the trolley wheel will at all times be maintained in its normal position; that is to say, lie substantially in a vertical plane regardless of the inclination of the trolley pole or the irregularities in the feed wire, or when the car is rounding a curve, and also removing any strain from the trolley pole and minimizing if not entirely overcoming the disadvantages incident to the trolley wheel jumping the wire.

It is also my purpose to provide a trolley harp with a self adjusting wheel and axle, wherein the wheel and axle will be arranged upon a bearing which is provided with novel means whereby the same will readily engage with the bore of the wheel and will not be permitted becoming accidentally disconnected from the wheel, the said bearing being rotatable with the axle and including a lubricant receptacle, whereby a lubricant is fed to the wheel to permit of the free rotation of the wheel upon its bearing.

A further object of the invention is the provision of contact plates for the members arranged between the wheel and trolley harp, whereby the said bearing members will be retained at all times in contacting engagement regardless of the angle or inclination which the wheel may assume with relation to the harp.

A still further object of the invention is the construction of a device of this class which will embody the desirable features of simplicity, efficiency, durability and strength, coupled with cheapness in the cost of manufacture and marketing and which may be readily applied to any type of trolley pole or trolley wheel.

With the above and other objects in view, the invention consists in the construction, combination and arrangement of parts hereinafter set forth and falling within the scope of the appended claims.

For the purpose of illustration the accompanying drawings disclose a satisfactory reduction of the improvement to practice, but the nature of the invention necessarily renders the same susceptible to embodiments in various forms a preferred form being illustrated in the drawings, and in which:

Figure 1 is a side elevation of a trolley harp constructed in accordance with the present invention, Fig. 2 is an end view of the same, Fig. 3 is a sectional view on the line 3—3 of Fig. 1, showing the wheel and axle arranged at an angle with relation to the trolley harp, Fig. 4 is a similar sectional view illustrating the wheel and axle arranged at a different angle from that illustrated in Fig. 3, Fig. 5 is a vertical sectional view on the line 5—5 of Fig. 2, showing the position of the axle bearing member when the same has reached the limit of its movement in one direction, Fig. 6 is a top plan view of the harp, the trolley wheel and axle being removed, Fig. 7 is a sectional view similar to Fig. 5 but showing the position of the bearing when rotated to the limit of its movement in an opposite direction to that disclosed in Fig. 5, Fig. 8 is a detail sectional view showing the manner in which the spring axle hook engages with one of the ends of the said axle and the means for retaining the hook upon the bearing, Fig. 9 is an enlarged elevation illustrating the manner in which the retaining or guard member for the hook retains the same within the curved slot provided for the reception of one of the ends of said hook, Fig. 10 is an elevation of the trolley wheel bearing, Fig. 11 is a transverse sectional view of the same, but showing the guard contact plates arranged thereon and the manner in which the fingers of the plates engage within the annular recess of the trolley wheel, Fig. 12 is a detail transverse sectional view on the line 12—12 of Fig. 11, Fig. 13 is a view of one of the axle bearing members, showing the parts disassociated, Fig. 14 is a perspective view of the contact member carried by the harp, Fig. 15 is a detail view of the contact washer associated with the member illustrated in Fig. 14, Fig. 16 is a detail view of the axle, Fig. 17 is a detail sectional view on the line 17—17 of Fig. 15, and Fig. 18 is a detail illustrating a manner in which the axle may be secured to the bearing casing, in lieu of the hook.

Referring now to the drawings in detail, the harp A, below its bifurcated portion which provides its arms B is formed with at least three openings 1, whereby the end of the trolley cord 2 may be threaded through the said openings and secured to the harp without necessitating the knotting of the said cord. The arms B have their upper corners rounded and inturned, as indicated by the numerals 3, the said inturned corners adapted to engage within the channeled sides of the trolley wheel W without, however, contacting with the said sides of the wheel. The inturned corners provide means which will effectively prevent the line or feed wire F passing between the arms and the sides of the trolley wheel, should the occasion arise wherein the wheel W is caused to jump the wire F. However, with my construction, I aim to provide means whereby the wheel cannot, under ordinary conditions, become disconnected from the wire, and to accomplish this, I provide the wheel with an adjustable axle or shaft 4, whereby the said axle will yield to the strain exerted between the wheel W and the feed wire F and sustain the wheel perpendicular to the wire, regardless of the angle which the harp may assume.

The harp arms B preferably have their opposite, normally vertical edges, beaded, the said beads being deeper at the corners, or gradually increasing from the socket of the harp to the terminals adjacent the corners, and the said arms adjacent the upper edges thereof are each provided with enlarged annular openings 5. Received within these openings and rotatable upon the arms are bearing casings or boxes 6. The members 6 each comprise two sections, an inner and an outer section, which are both of a similar formation. Each of the sections comprises a member having a central outturned rounded portion 7, the face of which is formed with a rounded opening 8, and the said rounded portions have their inner terminals integrally provided with flat angular portions 9 which terminate in outwardly extending flanges 10. The members are connected by suitable rivets 11, and when positioned upon the arms B, the flanges 10 engage with the rounded wall provided by the openings 5 in the arms B. It will thus be noted that the bearing boxes are free to rotate around the arms of the harp to which they are secured, and the rounded portions 7 of the bearing boxes provide housings for the reception of bearing balls 12. These balls 12 are free to rotate within the housings provided by the portions 8 of the bearing boxes or casings 6, and the said balls are provided with suitable transverse openings for the reception of the ends of the shaft or axle 4. The axle 4 is retained upon the bearing balls, in a manner which will hereinafter be fully described, and the annular flange 10 of the members of the bearing boxes are preferably formed with oppositely disposed fingers 13, while arranged upon the arms B of the harp are stop members 14 which are adapted to be contacted by the fingers 13, to limit the rotary movement of the bearing boxes or casings 6, the purpose of which will readily be understood. With such a construction, the bearing balls have their openings normally arranged in parallelism, and so the shaft or axle 4 is sustained in a horizontal position, and the wheel W at a right angle to the shaft. We will suppose that the wheel contacts with an irregularity or obstruction in the wire F, or that the car to which the harp and the pole provided therefor rounds a curve, say in a right hand direction to the path of travel of the car. The right hand side of the wire, or an obstruction upon the right hand side of the wire will forcibly contact with the right hand flange of the wheel W, and a pressure thus exerted upon the wheel will cause the same to exert a similar pressure upon the right hand end of the shaft or axle 4, and as a consequence, the axle 4 will rotate the right hand bearing box to permit of the said wheel being sustained at a right angle to the wire F, regardless of the inclination of the harp A and the arm to which it is attached.

The above construction may be applied to any ordinary trolley harp and any ordinary trolley wheel. The bearing boxes are preferably provided with concentrically arranged slots or openings 15 which are arranged centrally of the flat portions 9 of the said boxes. The opposite ends of the shaft may be provided with substantially T-shaped depressions, the small portions of the said openings communicating with the outer ends of the shaft or axle 4.

The numeral 17 designates what I term a lock hook for the axle. This hook comprises a rounded portion 18 having one of its ends passing through the slot or opening 15, and the terminal of the said portion being flanged, as at 19. The opposite end of the portion 18 is arranged at an angle, as indicated by the numeral 20, the extremity of the angular portion being bent to provide a head 21. It is to be understood that the lock hook 17 is constructed of resilient material, and the T-shaped depressions are of such formation and size as to readily permit of the entrance of the heads 21 and the angular portions 20 of the said hooks 17. When the said member 17 is sustained at an angle to the shaft or axle 4, after which the rounded portion 19 may be swung to bring its end through the slot or opening 15 and to have its head 19 arranged in contacting engagement with the outer face of the inner members of the bearing boxes. To permit of the insertion of this end of the hook, the said bearing boxes are provided with depressions 22 which communicate with the upper walls of the slots or openings 15, and to close these depressions, to prevent the withdrawal of the head 19, of the lock, from the slots or openings 15, I provide a substantially L-shaped guard plate 23, one of the angular members of which filling the depressions 22, and the opposite angular member being removably connected with the bearing boxes through the medium of bolt or screw members 24. The spring lock hooks 17 permit of a longitudinal movement of the shaft 4 with its ball bearings, but at the same time effectively prevent the accidental displacement of the shaft from its bearings. Such a structure permits of the free revolving of the bearing balls within the bearing boxes, irrespective of the rotary movement of the said boxes.

The wheel W which I employ, has its opposite faces dished inwardly and is provided with a central enlarged bore 25, and the sides of the wheel are provided with annular flanges which surround the said bore. The wall of the bore is centrally formed with a continuous depression or channel 26, and adapted to be received within the bore is a bearing hub 27. The member 27 is peripherally rounded to snugly engage with the wall of the bore 25 of the wheel, and the said member is of a width equaling or slightly exceeding the cross sectional diameter of the bore 25 and the flanges which surround the bore. The bearing hub 27 is centrally provided with a rounded axle opening 28 through which the axle 4 passes, and the wall provided by the said opening 28 is formed with a rib 29 which extends longitudinally of the said opening, and which is adapted to engage with a slot or channel 30 provided in the axle 4, whereby, under ordinary conditions, the bearing 27 and the axle 4 are sustained against rotary movement, and as a consequence, the wheel W freely revolves upon its bearing 27. The bearing 27 is further provided with a transverse opening 31 which is preferably arranged above the axle opening 28, and adjacent the periphery of the said bearing. An elongated slot 32 which is arranged centrally of the periphery of the bearing 27 communicates with the opening 31, and the said slot is of a length approximately equaling the width of the opening 31. The bearing comprises a substantially hollow member, and the lower portion of the said bearing is provided with a centrally arranged peripheral aperture 33 which communicates with the hollow interior of the bearing. The aperture is arranged directly over the annular channel 26 provided in the bore 25 of the wheel W, and the hollow bearing is adapted to receive a lubricant which will be drawn by suction to within the channel as well as to the wall of the bore of the wheel, thus providing for the lubrication of the wheel.

In order to secure the bearing within the bore of the wheel, I provide a pair of members which, for the sake of convenience, I will hereinafter refer to as guide contact plates. One of these plates is adapted to be arranged upon each of the opposite sides of the bearing, and each of the said plates, which may be designated by the numerals 34 is formed from a single piece of flat electric conducting material, each having an opening 35 which is adapted to be arranged to register with the axle opening 28 of the bearing 27, and each of the said plates has its upper portion bent inwardly, as at 36, the terminal of which being bent upwardly, as at 37, to provide what I will term a tongue, and the bent portion 36 is passed through the opening 31 to permit of its tongue passing through the elongated slot 32 and into the channel 26 of the bearing 27. The portion of each of the guide and contact plates 34 below its opening 35 is formed with an extension, which I shall term a tail 38, and this tail is formed with an elongated opening 39. The bearing 27, adjacent the lower edge thereof is provided with a transverse perforation 40 which is adapted for the reception of a rod 41, the said rod having its opposite ends bent at an angle to its main portion or body to provide hooks 42, and these hooks are adapted to pass through the openings 39, and when rotated to engage with the tail adjacent its openings 39 and so retain the members 34 upon the bearing.

The arms B of the harp, below their circular openings 5 and the bearing boxes are provided with outlet openings 42', and the outer faces of the said openings below the said openings is provided with spaced beads 43. Secured between these beads, as at 44, are the lower portions or ends of contact spring plates 45. These plates pass through the openings 42', the portions of the plates passing through the said openings being arranged at an angle to the ends of the plates which are secured to the arms of the harp, and the free ends of the plates are enlarged, as at 46, and provided with elongated openings 47 which surround the shaft 4, but the walls provided thereby are not contacted by the said shaft regardless of the movement of the shaft. The ends 46 of the contact springs exert a tension toward each other, and the free ends of the said springs are provided with extending portions forming tongues 48.

The numerals 49 designate contact washers which provide flat members or disks having central openings which register with the openings 28 of the bearing and the openings 35 in the guide or contact plates, and the spring plates 45 are adapted to exert a tension against the contact washers 49 to force the same into frictional engagement with the contact plates 34. The contact washers 49 are provided with a portion which extends beyond its perimeter, the said extending portion having its edges inturned to provide ears 50, and the ears of each of the contact washers being adapted to receive the tongues of the contact spring plates 45.

As illustrated in Fig. 18 of the drawings, the axle may be provided adjacent its ends with transverse openings 51, and a spring plate or disk 52 may be secured upon the outer members of the bearing boxes, the said member 52 having an opening which coincides with the opening in the bearing balls and with the openings in the outer faces of the bearing boxes, and the said plate adjacent the said opening is further provided with a rounded portion or ridge 52' (which overlies a depression 53 in the bearing box, and passing through the depression and ridge is a securing member, in the nature of a cotter pin 54, which also passes through the openings in the ends of the shaft or spindle 4. We will assume that the trolley wheel is at a direct vertical position shown in Figs. 1 and 2 of the drawings. The wheel is assisted in maintaining this position through the medium of springs 45. Should the trolley feed wire F be rounded in a right hand direction, the wheel contacting the said rounded portion of the wire will assume the position illustrated in Figs. 1 and 2. The wire F bearing upon the wheel causes the same to assume its said vertical position. In Fig. 4 the wheel is arranged to engage with a rounded portion of the feed wire which extends in a left hand direction with regard to the path of travel of the vehicle to which the trolley pole is attached and after the said wheel rounds the curve, the pressure of the wire upon the spring as well as the lower spring 45 serves to return the wheel to its initial vertical position.

From the above description, taken in connection with the accompanying drawings, the simplicity of the device as well as the advantages thereof will, it is thought, be perfectly apparent to those skilled in the art to which such inventions appertain without further description.

Having thus described the invention, what I claim is:

1. A trolley harp carrying a trolley wheel, a shaft for the wheel, bearings provided in the trolley harp for the shaft, rotatable boxes carried by the harp and receiving the bearing, and the said bearings being arranged eccentrically of the boxes.

2. A trolley harp having its arms provided with rotatable boxes, said boxes having eccentric openings, rotatable bearings arranged within the openings, a shaft for the bearings and a trolley wheel carried by the shaft.

3. A trolley harp having its arms provided with openings, a bearing box mounted for rotation within each of the openings, each of the bearing boxes having an eccentric opening, a bearing mounted for rotation within each of the openings, a shaft within the bearings, a trolley wheel mounted upon the shaft, and spring members connected with the harp and exerting a tension upon the opposite sides of the trolley wheel.

4. A trolley harp, journal boxes carried by the arms of the harp, bearing members within the boxes, a shaft for the bearings, a trolley wheel carried by the shaft, means, including mechanism for limiting the rotary movement of the bearings within the boxes, and means including members attached to the boxes and coöperating within the shaft for limiting the longitudinal movement of the shaft with relation to the bearings.

5. A trolley harp having rotatable bearing boxes provided with eccentric openings, spherical bearings within the openings, a shaft arranged within the bearings, means, comprising a detachable member for sustaining the shaft within the bearings and for limiting the longitudinal movement of the shaft, means for sustaining the detachable members upon the boxings and in engagement with the shaft, means arranged between the bearings and harp for limiting the longitudinal movement of the boxings upon the harp in two directions, and a trolley wheel mounted upon the shaft.

6. A trolley harp and a trolley wheel therefor, an axle for the wheel, bearing balls for the axle, bearing boxes for the balls, said boxes arranged for rotation upon the harp, means for limiting the rotation of the boxes, and the said bearing balls being arranged eccentrically within the boxes.

7. A trolley harp having its arms provided with circular openings, circular bearing boxes constructed in sections and being formed with flanges arranged within the openings and having their flanges contacting with the opposite faces of the arms, said boxes having their flanges provided with fingers, stop members arranged upon the arms within the path of contact of the fingers, bearing balls eccentrically arranged within the boxes, means for securing the sections of the boxes, a shaft for the bearing balls, and a trolley wheel mounted upon the shaft.

8. A trolley harp having its arms provided with registering annular openings, flange bearing boxes within each of the openings, means for limiting the rotary movement of the boxes in two directions, bearing balls eccentrically arranged within the boxes, a shaft passing through each of the bearing balls, a trolley wheel upon the shaft, a spring lock removably arranged within the ends of the shaft, the boxes having concentric slots for the reception of the free end of each of the spring locks, each of the said locks having its free end provided with a head which is adapted to contact with the inner face of each of the bearing boxes to sustain the lock hooks upon the boxes and to permit of a limited movement of the said lock hooks.

9. A trolley harp having its arms provided with oppositely disposed annular openings, flanged bearing boxes mounted for rotation within the openings, means for limiting the rotary movement of the bearing boxes, a bearing ball arranged eccentrically within each of the boxes, a shaft passing through the boxes and through the bearing balls, a trolley wheel arranged upon the shaft, the ends of the shaft having openings, spring locks co-acting with the openings, said locks each comprising a curved body portion having one of its ends formed with a head, the second end being bent to engage within the openings in the ends of the axle and having its end offset to provide a second head, the boxes each having a concentrically arranged opening and being further provided with a depression which enters the opening, and whereby the first mentioned headed end of the lock may be inserted to within the concentric opening of each of the boxes, and an L-shaped guard plate having one of its arms filling the depression and its second arm secured to the bearing boxes.

10. A trolley harp having rotatable bearing boxes, bearing eccentrically arranged within the boxes, a shaft for the bearings, a hub mounted upon the shaft and secured thereto, a trolley wheel mounted for rotation upon the hub, and means arranged between the hub and wheel for sustaining the said wheel upon the hub.

11. A trolley harp having its arms provided with revoluble bearing boxes, means for limiting the rotation of the boxes, a bearing ball within each of the boxes and arranged eccentrically thereof, a shaft for the bearing balls, means for retaining the shaft upon the bearing balls, a hub removably secured to the shaft, a trolley wheel mounted for rotation upon the hub, removable plates for sustaining the trolley wheel upon the harp, and means for securing the said plates to the hub.

12. A trolley harp having its arms provided with rotatable bearing boxes, means for limiting the rotary movement of the boxes, bearing balls arranged within the boxes, and disposed eccentrically thereof, a shaft engaging the bearing balls, means for sustaining the shaft upon the bearing balls, means for permitting a limited rotary movement of the shaft, a hub secured upon the shaft, a trolley wheel bearing upon the harp, spring plates for retaining the wheel upon the hub, means arranged upon the hub for retaining the plates thereon, the hub being hollow and being provided with a transverse opening and with a peripheral aperture, substantially as and for the purpose set forth.

13. A trolley harp having its arms provided with annular openings, circular bearing boxes arranged for rotation within the openings, means for limiting the rotary movement of the bearing boxes, bearing balls eccentrically mounted within the openings, a shaft loosely arranged within the bearing balls, means for sustaining the shaft within the bearing balls to permit of a partial rotary and a limited longitudinal movement of the said shaft, and a trolley wheel upon the shaft.

14. A trolley harp having its arms provided with diametrically opposite circular openings, flanged circular bearing boxes arranged for rotation within the openings, bearing balls eccentrically arranged within the bearing balls, means for sustaining the shaft within the bearing balls to permit a limited rotary and a limited longitudinal movement of the shaft, a trolley wheel upon the shaft, and springs means for sustaining the said wheel centrally of the shaft and out of contact with the arms of the harp.

15. In a trolley harp, a trolley wheel for the harp, a shaft mounted in bearings upon the harp and upon which the wheel is journaled, and resilient means for sustaining the shaft in its bearings and to permit of a limited longitudinal movement of the shaft without allowing the same to leave its bearings when a side pressure is exerted upon the wheel and delivered therefrom to the shaft.

In testimony whereof I affix my signature in presence of two witnesses.

ALFRED JOHNSON.

Witnesses:
Wm. F. Gibbs,
J. L. Howe.